US012255931B2

United States Patent
Gaito et al.

(10) Patent No.: US 12,255,931 B2
(45) Date of Patent: Mar. 18, 2025

(54) METHODS, SYSTEM AND COMMUNICATION DEVICES RELATED TO LAWFUL INTERCEPTION

(71) Applicant: Telefonaktiebolaget LM Ericsson (publ), Stockholm (SE)

(72) Inventors: Daniele Gaito, Naples (IT); Raffaele Costabile, Torre del Greco (IT); Gaetano Barba, Sant'Antonio Abate (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/010,658

(22) PCT Filed: Jun. 18, 2020

(86) PCT No.: PCT/EP2020/066929
§ 371 (c)(1),
(2) Date: Dec. 15, 2022

(87) PCT Pub. No.: WO2021/254622
PCT Pub. Date: Dec. 23, 2021

(65) Prior Publication Data
US 2023/0224337 A1     Jul. 13, 2023

(51) Int. Cl.
*H04L 9/40*      (2022.01)
*H04L 67/00*    (2022.01)

(52) U.S. Cl.
CPC ............ *H04L 63/306* (2013.01); *H04L 67/34* (2013.01)

(58) Field of Classification Search
CPC ... H04L 41/0806; H04L 63/306; H04L 67/34; H04W 4/50; H04W 12/80
See application file for complete search history.

(56) References Cited

U.S. PATENT DOCUMENTS

| | | | |
|---|---|---|---|
| 10,785,817 B2 * | 9/2020 | Palat | H04W 76/15 |
| 2015/0373523 A1 * | 12/2015 | Jeong | H04L 41/5029 455/406 |
| 2017/0230917 A1 * | 8/2017 | Ouchi | H04L 5/0055 |
| 2019/0053292 A1 * | 2/2019 | Ali | H04W 88/06 |

(Continued)

OTHER PUBLICATIONS

"ETSI GR NFV-SEC 011 V1.1.1", Network Functions Virtualization (NFV); Security; Report on NFV LI Architecture, Apr. 2018, 1-49.

(Continued)

*Primary Examiner* — Mahran Y Abu Roumi
(74) *Attorney, Agent, or Firm* — Murphy, Bilak & Homiller, PLLC

(57) ABSTRACT

The invention relates to methods, communication devices, computer programs and computer program products related to Lawful Interception, LI. An LI, Administration Function, ADMF, sends a request over an X1 interface to a Network Element, NE, that is configured to perform an action associated with an LI, to add information associated with a destination or modify information of an existing destination for a message to be sent from the NE to the LI ADMF over the X1 interface. The NE receives the request, adds information associated with a destination or modifies information of an existing destination, and sends a response to the LI ADMF over the X1 interface, wherein the response comprises a result associated with the request.

20 Claims, 5 Drawing Sheets

(56) References Cited

U.S. PATENT DOCUMENTS

| | | | | |
|---|---|---|---|---|
| 2020/0008113 A1* | 1/2020 | Chen | ................ | H04W 36/0038 |
| 2021/0067299 A1* | 3/2021 | Wu | ................ | H04W 36/0069 |
| 2022/0014953 A1* | 1/2022 | Teyeb | ................ | H04W 24/10 |
| 2022/0132615 A1* | 4/2022 | Sharma | ................ | H04W 48/20 |

OTHER PUBLICATIONS

"ETSI TS 102 232-1 V3.21.1", Lawful Interception (LI); Handover Interface and Service-Specific Details (SSD) for IP delivery; Part 1: Handover specification for IP delivery, Dec. 2019, 1-74.

"ETSI TS 103 221-1 V1.6.1", Lawful Interception (LI); Internal Network Interfaces; Part 1: X1, Dec. 2019, 1-44.

"ETSI TS 103 280 V2.4.1", Lawful Interception (LI); Dictionary for common parameters, Dec. 2019, 1-30.

3GPP, "3GPP TS 33.126 V15.1.0", 3rd Generation Partnership Project; Technical Specification Group Services and System Aspects; Security; Lawful Interception requirements (Release 15), Dec. 2018, 1-18.

3GPP, "3GPP TS 33.126 V16.1.0", 3rd Generation Partnership Project; Technical Specification Group Services and System Aspects; Security; Lawful Interception requirements (Release 16), Sep. 2019, 1-19.

\* cited by examiner

METHODS, SYSTEM AND COMMUNICATION DEVICES RELATED TO LAWFUL INTERCEPTION

TECHNICAL FIELD

The invention relates to a communication device comprising a Lawful Interception Administration Function, a communication device hosting a Network Element, a method performed by a communication device comprising a Lawful Interception Administration Function, a method performed by a communication device hosting a Network Element, a lawful interception system implemented in a communication network, corresponding computer programs and computer program products.

BACKGROUND

FIG. 1 shows an exemplary Lawful Interception, LI, network and system according to document ETSI GR NFV-SEC 011 V1.1.1. FIG. 1 shows a high-level architecture for lawful interception in a virtualized environment. Entities are logically represented, therefore it does not necessary reflect separate physical entities. Entities will be described herein for a non-virtualized environment and for a virtualized environment.

The exemplary LI system comprises a Law Enforcement Agency, LEA, network and a Communications Service Provider, CSP, network. LEA 101 is an organization authorized by a lawful authorization based on the applicable jurisdiction to request and receive the results of telecommunications interceptions of an interception target. The target is a person of interest and/or user equipment possessed or used by the person of interest being surveyed by the LEA 101. Said LEA 101 communicates with the CSP network through a network interface, called Handover Interface, HI. LEA 101 comprises a Warrant Issuing Authority/Warrant Issuing Authority device 102 and a Law Enforcement Monitoring Facility, LEMF 103. The Warrant Issuing Authority 102 issues an intercept request, e.g. lawful authorization or warrant to the CSP through a first Handover Interface, HI1. The LEMF 103 collects the intercepted information of the interception target. The LEMF 103 communicates with an LI site 104 through a second Handover Interface, HI2, for receiving Intercept Related Information, IRI, and through a third Handover Interface, HI3, for receiving Content of Communication, CC. Interfaces HI1, HI2, and HI3 are specified in more detail in ETSI TS 102 232-1 V3.21.1. Entities within the CSP network communicate through internal network interfaces.

The LI site 104 comprises an LI, Administration Function, ADMF, 105 and a Mediation and Delivery Function, MF/DF, 106. The LI ADMF 105 communicates with the MF/DF 106 through an X1_2 interface and an X1_3 interface. The LI ADMF 105 generate, based on said received intercept request, a warrant comprising one or more interception target identities, and send the warrant to a Point Of Interception, POI, 107, within a Network Element, NE, 108 via an interface denoted by X1_1. The NE 108 is an entity that performs the interception. Said POI 107 detects the interception target communication, derives the IRI or CC from the target communications, and delivers the POI Output to the MD/MF 106. POIs are divided into two types based on the type of data they send to the MF/DF 106: IRI-POI delivers Intercept Related Information to the MF through an X2 interface and CC-POI delivers CC to the MF through an X3 interface. IRI are collection of information or data associated with telecommunications services involving the interception target identity, specifically call associated information or data (e.g. unsuccessful call attempts), service associated information or data (e.g. service profile management by subscriber) and location information. The CC is information exchanged between two or more users of a telecommunications service, excluding IRI. The MF receives IRI and CC and transforms them from internal interface format to Handover Interface format. The DF will then handle dispatching of said data to the one or more designated LEAs 101.

In a Network Functions Virtualization, NFV, environment, MF/DF 106 and POI 107 may be embedded within a Network Function, NF. In this scenario, an X1_DC interface is used by a virtualized POI, vPOI and virtualized MF/DF, vMF/vDF to inform each other of changes (e.g. scaling or mobility) in the virtualized environment. An NFV Management and Orchestration function, MANO, and/or a Security Orchestrator, SO, 109 handle the management and orchestration of all resources in a virtualized data center including computing, networking, storage, and virtual machine, VM, resources. An LI controller is responsible for creating, modifying, deleting, and auditing vPOI and vMF/vDF configuration during their lifecycle. The LI controller has two sub-functions: LI controller at network service application level, called LI App Controller 110, and LI controller at NFV level, called LI NFV controller 111. LI App Controller 110 and LI ADMF 105 communicate through an LI-Os-0 interface; LI App controller 110 and vPOI 107 communicate through an X0_1 interface; LI App controller 110 and vMF/vDF 106 communicate through an X0_2 interface. The LI NFV controller 111 is managed by the LI App controller 110 via an LI-OS-1 interface. X1_DC, X0_1, X0_2, LI-OS-0 and LI-OS-1 interfaces are specified in more detail in ETSI GR NFV-SEC 011 V1.1.1.

A Lawful Interception Routing Proxy Gateway, LRPG, 112 can be used to provide a Handover Interface proxy function to isolate the LEMF 103 and prevent the LEMF 103 to be visible to MANO 109. This function is optional.

FIG. 2 is a block diagram of an exemplary LI network and system according to document ETSI TS 103 221-1 V1.6.1. The exemplary LI system comprises a number of communication devices, which host an NE, 108 connected to one LI ADMF 105 through the X1 interface. It is to be noted that terms X1_1 and X1 are used in an interchangeable way.

Each LI ADMF 105 is connected to one LEA 101. Only one LI ADMF 105 may make changes to a given NE 108. Some deployments may involve multiple LI ADMFs 105 for redundancy. In this case, the one or more LI ADMFs 105 manage the same set of information and are considered as one from a logical point of view.

Current ETSI TS 103 221-1 V1.6.1 does not fully support the deployment of virtualized network function, VNF, in cloud compute environment using one click configuration and the automatic scaling of resources since an LI ADMF address can only be manually configured on the NEs.

SUMMARY

An object of the invention is to enable a deployment of LI or LI VNF which reduces e.g. maintenance in a cloud compute environment.

It is to be noted that terms X1_1 and X1 are used in an interchangeable way and they both refer to the interface used for the communication between an LI ADMF and a POI within an NE. The terms POI, NE, and "host computer which hosts the NE" are used in an interchangeable way. The terms LI ADMF and "host computer which hosts the LI ADMF" are used in an interchangeable way throughout the description and claims.

To achieve said object, in a first aspect, a communication device is provided. Said communication device comprises an LI ADMF, a processor and a memory, said memory containing instructions executable by said processor. The communication device of this first aspect sends a request to an NE, that is configured to perform an action associated with a lawful interception. The request indicates to add information associated with a destination or modify information of an existing destination for a message to be sent from the NE to the LI ADMF over an X1 interface. The communication device of this first aspect further receives a response from the NE to the request, wherein the response comprises a result associated with the request. Hereby is enabled that one or more addresses of the LI ADMF where the NE sends one or more messages over the interface X1/X1_1 do not need to be manually configured in the NE every time that the destination changes. Thus a deployment of LI with reduced OPEX is achieved for LI in a cloud compute environment.

In a second aspect, there is provided a communication device, which hosts an NE, and comprises a processor and a memory, said memory containing NE instructions for performing an action associated with a lawful interception and executable by said processor, whereby said communication device is operative to receive a request from an LI ADMF. Said request comprises information that instructs the NE to add information associated with a destination or modify information of an existing destination for a message to be sent from the NE to the LI ADMF over an X1 interface, The communication device of this first aspect is further operative to add information associated with a destination or modify information of an existing destination and send a response to the request, wherein the response comprises a result associated with the request.

In a third aspect, there is provided a method performed by a communication device comprising an LI ADMF. The method of this further aspect comprises sending a request to an NE that is configured to perform an action associated with a lawful interception, to add information associated with a destination or modify information of an existing destination for a message to be sent from the NE to the LI ADMF over an X1 interface. The method further comprises receiving a response from the NE to the request, wherein the response comprises a result associated with the request.

In a fourth aspect, there is provided a method performed by a communication device hosting an NE. The method of this further aspect comprises receiving a request from an LI ADMF, for adding information associated with a destination or modifying information of an existing destination for a message to be sent from the NE to the LI ADMF over an X1 interface. Having received the request, the NE adds the destination or modifies information of the existing destination. A response to the request is then transmitted to the LI ADMF, wherein the response comprises a result associated with the request.

In an embodiment of the first and second aspect, the added or modified information of the destination comprises a destination identifier, a human-readable name associated with the destination, information about one or more interfaces on the NE and an address of the destination.

In an embodiment of the first and second aspect, the response comprises information representative of any one of the following: an OK—Acknowledged and Completed, if the request is successfully completed; an OK—Acknowledged if the request cannot be completed within a predetermined time; and a predetermined error if the NE was unable to perform or understand the request.

In an embodiment of the first, second, third, and fourth aspect, the request comprises information indicative of two or more interfaces for the message to be sent over, wherein the two or more interfaces are X1 and X2, or X1 and X3, or X1 and X2 and X3. This enables the NE to send one or more messages over two or more interfaces, wherein if one of the two or more interfaces is X1. The X1 interface does not need to be manually configured in the NE every time that the destination changes. Thus, the installation/maintenance costs and faults in configuration that can be due to manual mistakes are reduced.

In an embodiment of the first, second, third, and fourth aspect, the request that is transmitted by the LI ADMF and received by the NE may be a CreateDestinationRequest message or a ModifyDestinationRequest message of ETSI TS 103 221-1 V1.6.1.

In an embodiment of the first and second aspect, the request is the CreateDestinationRequest message and comprises a DeliveryType field that comprises information indicative of one or more interfaces for the message, wherein the one or more interfaces are only X1, X1 and X2, or X1 and X3, or X1 and X2 and X3.

In an embodiment of the first and second aspect, the response to the CreateDestinationRequest message, transmitted by the NE to the LI ADMF may be a CreateDestinationResponse message of ETSI TS 103 221-1 V1.6.1.

In an alternative embodiment of the first and second aspect, the request is the ModifyDestinationRequest message and comprises a DeliveryType field that comprises information indicative of one or more interfaces for the message, wherein the one or more interfaces are only X1, X1 and X2, or X1 and X3, or X1 and X2 and X3.

In an embodiment of the first and second aspect, the response to the ModifyDestinationRequest message, transmitted by the NE to the LI ADMF may be a ModifyDestinationResponse of ETSI TS 103 221-1 V1.6.1.

In an embodiment of the first, second, third, and fourth aspect, the message sent over the X1 interface is a report issue request, wherein the report issue request is sent from the NE to the LI ADMF after the NE has identified a type of issue, wherein the type of issue comprises the issue related to a task, a destination, and the NE. This enables the LI ADMF to select the type of issue to be received over the X1 interface, thus reducing the signaling related to type of issues that the LI ADMF does not manage.

In an embodiment of the first and second aspect, the issue comprises a warning or fault.

In an embodiment of the first, second, third, and fourth aspect, the LI ADMF is configured to select a report issue request to be received from the NE over the X1 interface.

In an embodiment of the first and second aspect, the report issue request comprises a ReportTaskIssueRequest, a ReportDestinationIssueRequest, or a ReportNEIssueRequest.

In an alternative embodiment of the first, second, third, and fourth aspect, the CreateDestinationRequest message comprises a DeliveryType field that comprises information representative of one or more interfaces for the message, wherein if the interface is X1, the field also comprises the type of issue.

In an alternative embodiment of the first, second, third, and fourth aspect, the ModifyDestinationRequest message comprises a DeliveryType field that comprises information representative of one or more interfaces for the message to be sent over, wherein if the interface is X1, the field also comprises the type of issue.

In an alternative embodiment of the first, second, third, and fourth aspect, the request is a message that comprises fields of the CreateDestinationRequest and an X1DeliveryTypeFilter field, wherein the X1DeliveryTypeFilter field comprises information of the type of issue that can be delivered to the destination over the X1 interface from the NE.

In an alternative embodiment of the first, second, third, and fourth aspect, the request is a message that comprises the fields of ModifyDestinationRequest and an X1DeliveryTypeFilter field, wherein the X1DeliveryTypeFilter field comprises information of the type of issue that can be delivered to the destination over the X1 interface from the NE.

In an embodiment of the first, second, third, and fourth aspect, a default value of the X1DeliveryTypeFilter field comprises the information of the types of issue that can be delivered to the destination over the X1 interface from the NE. This enables the LI ADMF to receive all types of issue over the X1 interface, if the LI ADMF does not need to distinguish among the different type of issues to be received.

In some embodiments of the first and second aspect, the LI ADMF is configured for sending the request as a first message to the NE after the establishment of a connection with the NE. This enables the NE to send a message to the LI ADMF after the establishment of a connection between LI ADMF and NE, reducing the waiting time due to a manual configuration, thus speeding up the process.

In some embodiments of the second aspect, the network device is a radio base station.

In some embodiments of the second aspect, the NE is one of an Access and Mobility Management Function, a User Plane Function, and a Unified Data Management.

In yet a further aspect, there is provided a lawful interception system implemented in a communication network, wherein the lawful interception system comprises an LI ADMF and an NE. The lawful interception system of this further aspect comprises the LI ADMF sending a request to the NE, for adding information associated with a destination or modifying information of an existing destination for a message to be sent from the NE to the LI ADMF over an X1 interface. The NE receives the request from the LI ADMF; the NE adds information associated with the destination or modifying information of the existing destination for the message to be sent from the NE to the LI ADMF over the X1 interface; and the NE sends a response to the LI ADMF, wherein the response comprises a result associated with the request. The lawful interception system further comprises the LI ADMF receiving the response from the NE to the request, wherein the response comprises a result associated with the request.

In an embodiment, the lawful interception system also comprises a second LI ADMF, wherein the second LI ADMF sends a request to the NE, for adding information associated with a destination or modifying information of an existing destination for a message to be sent from the NE to the LI ADMF over an X1 interface. This enables two or more LI ADMF s to configure and manage the same NE, overcoming the limitations of the current standard and reducing the number of NEs used.

In an embodiment, the lawful interception system comprises a second NE, wherein the second NE receives the request from at least one LI ADMF.

In yet a further aspect, there is provided a computer program, comprising instructions, which, when run on a processing unit in a communication device comprising an LI ADMF causes the communication device to send a request to an NE, that is configured to perform an action associated with a lawful interception, to add information associated with a destination or modify information of an existing destination for a message to be sent from the NE to the LI ADMF over an X1 interface; and receive a response from the NE to the request, wherein the response comprises a result associated with the request.

In yet a further aspect, there is provided a computer program product comprising a computer readable storage means on which a computer program, as summarized above, is stored.

In yet a further aspect, there is provided a computer program, comprising instructions, which, when run in a processing unit in a communication device hosting an NE, for performing an action associated with a lawful interception, causes the communication device to receive a request from an LI ADMF, for adding information associated with a destination or modifying information of an existing destination for a message to be sent from the NE to the LI ADMF over an X1 interface; add the destination or modify information of the existing destination; and send a response to the request, wherein the response comprises a result associated with the request.

In yet a further aspect, there is provided a computer program product comprising a computer readable storage means on which a computer program, as summarized above, is stored.

BRIEF DESCRIPTION OF THE DRAWINGS

For an even better understanding of the present disclosure, and to show more readily how it may be carried into effect, reference will now be made, by way of example, to the following drawings, in which.

DETAILED DESCRIPTION

Embodiments will be illustrated herein with reference to the accompanying drawings. These embodiments are provided by way of example so that this disclosure will be thorough and complete, and will fully convey the scope of the inventive concept to those skilled in the art.

Illustrative embodiments are related to lawful interception architectures for 5G networks. However, the disclosed embodiments can be adapted in a straightforward manner to a variety of other types of communication systems. One or more ETSI technical specifications (TS) may provide further explanation of network elements/functions and/or operations that may interact with parts of the inventive solutions, e.g., the above-referenced TS 103 221-1 V1.6.1. Further, details relating to LI in a 5G system are described in 3GPP TS 33 126 V15.1.0 and V16.1.0.

In the present document, the term "interface" refers to an electronic interface for the exchange of information between two entities. The terms X1_1 and X1 are used in an interchangeable way and they both refer to the interface used for the communication between an LI ADMF 301 (or a host computer which hosts the LI ADMF 301), and a POI of an NE 302 (or the host computer which hosts the NE 302). The terms POI and NE are used in an interchangeable way.

According to one embodiment, an LI ADMF 301 sends 402 a request over an X1 interface to an NE 302, that is configured to perform an action associated with an LI, to add information associated with a destination or modify information of an existing destination, for a message to be sent from the NE 302 to the LI ADMF 301 over the X1 interface. The NE 302 receives 501 the request, adds 502 information associated with a destination or modifies information of an existing destination, and sends 503 a response over the X1 interface to the LI ADMF 301, wherein the response comprises a result associated with the request.

Thus, one or more addresses of the LI ADMF 301 where the NE sends messages over the interface X1 does not need anymore to be manually configured in the NE every time that the destination changes. This decreases the installation and maintenance costs, the risk of faults in configuration, and the time for installation and upgrades.

Figure 1:
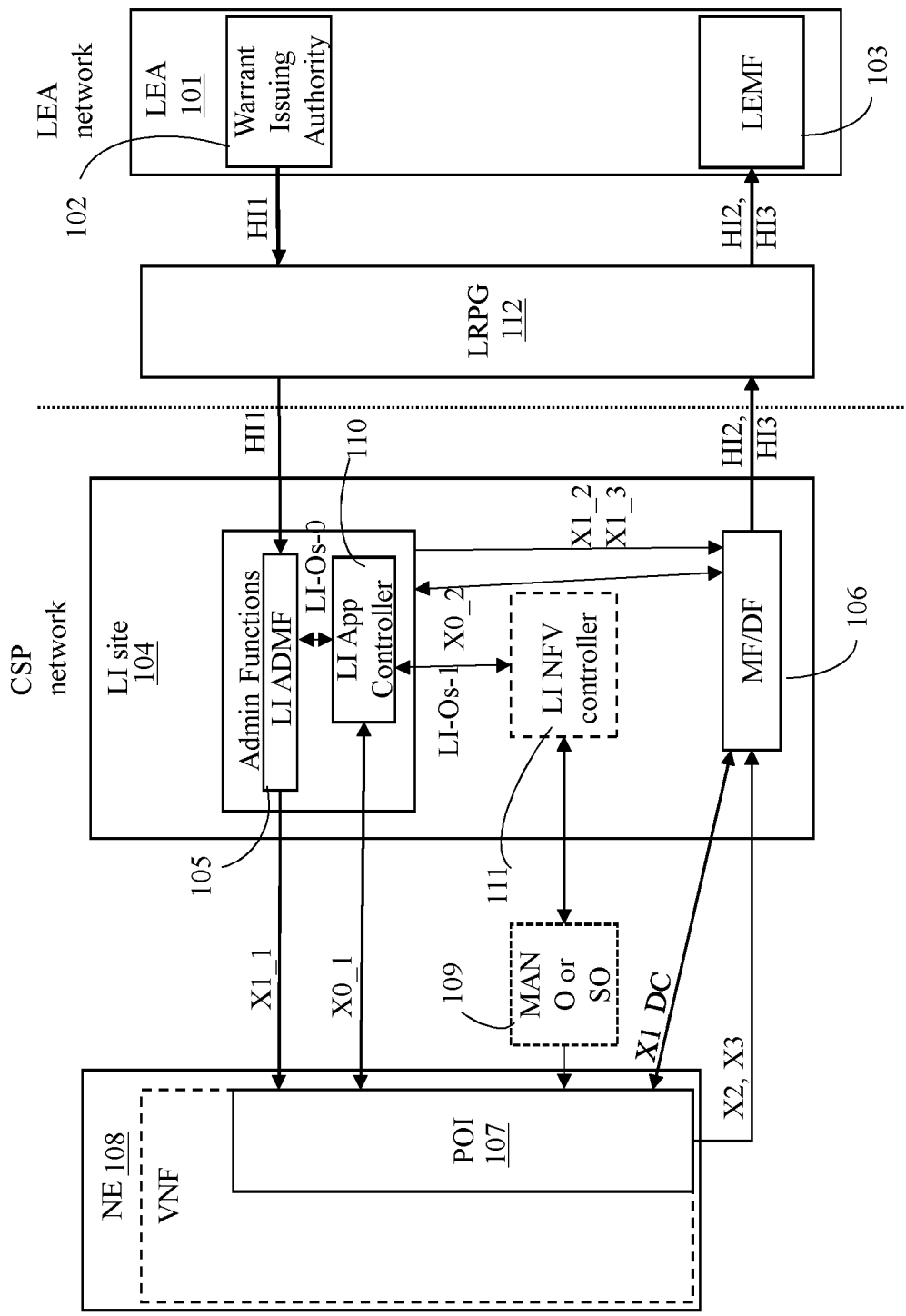
FIG. 1 is a block diagram of an exemplary LI network and system according to prior art.
Figure 2:
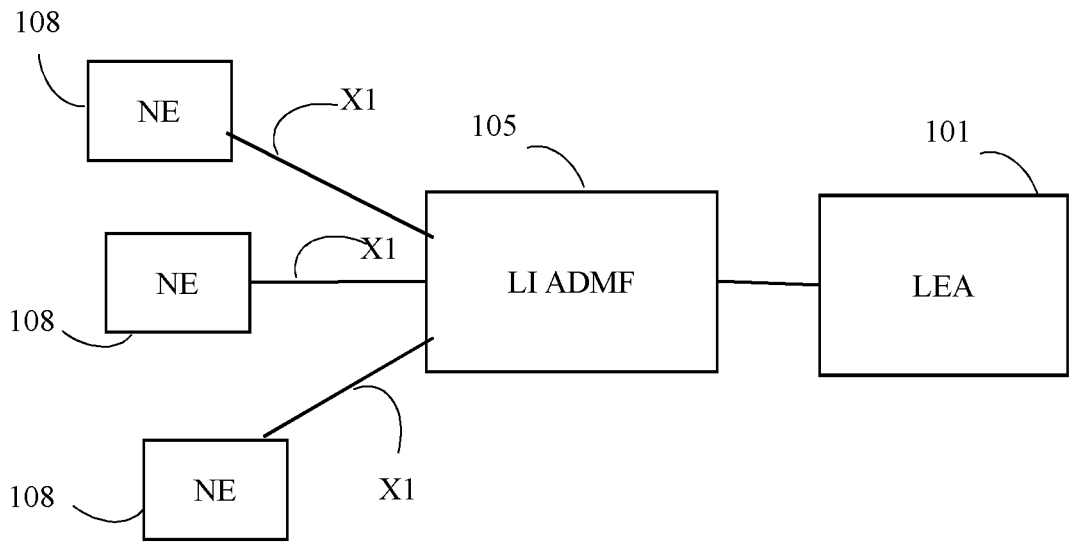
FIG. 2 is a block diagram of an exemplary LI network and system according to prior art.
Figure 3:
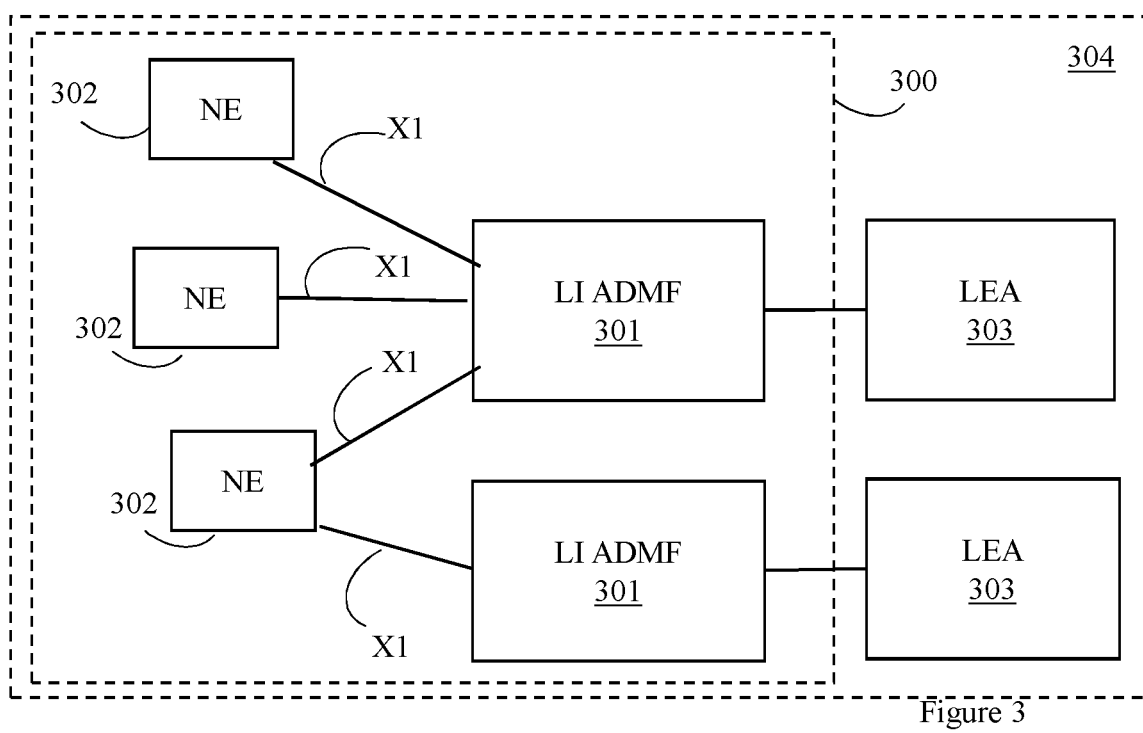
FIG. 3 is a block diagram of an exemplary LI network in which a system and a method described herein may be implemented.

FIG. 3 shows an exemplary LI network and system. The exemplary LI system comprises a number of communication devices, which host an NE 302 connected to one or more LI ADMFs 105 through an interface X1. Each one of the LI ADMFs 105 are connected to a LEA 101 as described in the background. Two different LEAs 101 are shown in FIG. 3 for illustrative purposes only. In case the one or more LI ADMFs 105 manage the same set of information, they are considered as one from a logical point of view.

According to one embodiment and as illustrated in FIG. 3, one NE 302 is connected to one or more LI ADMFs 105, wherein the ADMFs 105 manage separate and different information. The ADMFs 105 are considered separate entities from a logical point of view and each one is managed by a different LEA 101.

The LI ADMF 301 can be hosted on a communication device different from the device that hosts the NE 302 and the LEA 101, or the LI AMDF 301 can run on the same communication device which hosts the NE 302, e.g. the LI ADMF 301 runs in a VM.

In a 5G system, the communication device, which hosts the NE 302, can be a radio base station, e.g. a gNodeB, gNB, in an access network, or any network element/function of the core network, 5GC, which is configured to enable lawful interception and other techniques described herein. Such a core network node may be an Access and Mobility Management Function, AMF, Security Anchor Function, SEAF, Unified Data Management, UDM, Session Management Function, SMF, SMS Function, SMSF, and a User Plane Function, UPF. For example, an IRI-POI can be hosted in a 5GCfunction such as AMF, SMF, UDM, SMSF and a CC-POI can be hosted in a 5GC function such as UPF.

Figure 4:
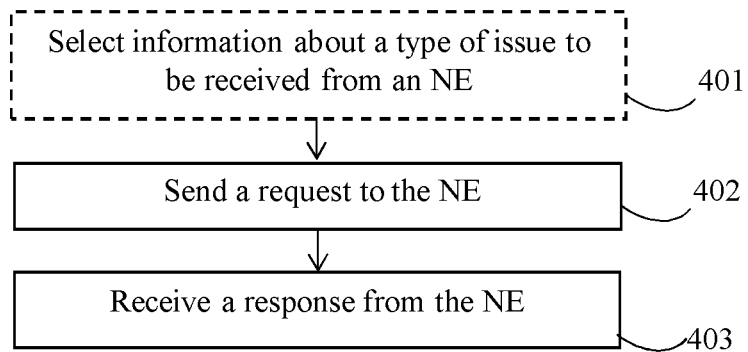
FIG. 4 is a flowchart illustrating a method performed by a communication device according to embodiments herein.

FIG. 4 is a flowchart illustrating an embodiment of a method for adding or modifying information on an NE 302, associated with a destination of an LI ADMF 301. The method is carried out by a communication device comprising an LI ADMF 301, such as one of the LI ADMF 301 of FIG. 3. Referring to FIG. 4, the method comprises:

sending 402 a request to an NE 302 that is configured to perform an action associated with an LI, to add information associated with a destination or modify information of an existing destination for a message to be sent from the NE 302 to the LI ADMF 301 (or the host computer which hosts the LI ADMF 301) over an X1 interface, receiving 403 a response from the NE 302 to the request, wherein the response comprises a result associated with the request.

According to an embodiment, the NE 302 sends 503 the response to the request sent from the LI ADMF 301, wherein the response comprises a result associated with the request. The response to the LI ADMF 301 from the NE 302 comprises information representative of any one of the following: an OK—Acknowledged and Completed, if the request is fully understood, compliant and has been successfully completed; an OK—Acknowledged if the action requested cannot be completed within a time interval predetermined at the NE 302 and at the LI ADMF 301; and a predetermined protocol error if the NE 302 was unable to perform or understand the request. See standard ETSI TS 103 221-1 V1.6.1 for further details.

Aspects and embodiments of these aspects of the present invention may remove the need of a manual configuration of the destination of the LI ADMF 301 on the NE 302. This would reduce installation/maintenance costs and faults in configuration that can be due to manual mistakes, and speedup the address configuration process.

Furthermore, security may be increased keeping the LI ADMF 301 address secret and using only the X1 interface for controlling the LI functionality.

Furthermore, aspects and embodiments of these aspects may enable the deployment of VNF in cloud compute environment using one click configuration and enable automatic scaling. In case of NFV LI ADMF, if the NFV LI ADMF destination changes, the new NFV LI ADMF address requires to be manually configured on all the NEs 302 according to the current standard. Aspects and embodiments of these aspects may remove this problem, making the process automatic.

The request and/or response is/are received and/or sent over the X1 interface and according to a protocol between the NE 302 and the LI ADMF 301. Communication protocols comprise, but are not limited to, Hypertext Transfer Protocol, HTTP, over Transport Layer Security, TLS, and HTTP/2. LI ADMF 301 and NE 302 here both run HTTP clients and servers: if the LI ADMF 301 is the requester, the LI ADMF 301 may use its HTTP client and the NE 302 may use its HTTP server; if the NE 302 is the requester, the NE 302 may use its HTTP client and the LI ADMF 301 may use its HTTP server. A request is, according to one embodiment, a "POST" message. A response may be sent as a HTTP response. The HTTP response may indicate HTTP level errors within the range of HTTP error codes. If the HTTP level transaction is successful, then the response in this embodiment is a 200 OK message. HTTP error codes are in this embodiment only used to indicate HTTP-level errors and should here not be used to indicate errors with the X1 responses themselves. X1-level errors may be indicated by use of the appropriate X1 ErrorResponse, encoded and returned as a HTTP 200 OK response. See ETSI TS 103 221-1 V1.6.1 for X1-level error codes.

According to an embodiment, the request sent from the LI ADMF 301 to the NE 302 can be a CreateDestinationRequest message or a ModifyDestinationRequest message, according to ETSI TS 103 221-1 V1.6.1, e.g in the form of a HTTP Post. The CreateDestinationRequest message is sent from the LI ADMF 301 to the NE 302 to add information to the NE 302, associated with a destination of the LI ADMF 301. The ModifyDestinationRequest message is sent from the LI ADMF 301 to the NE 302 to modify information on the NE 302, associated with a destination of the LI ADMF 301 already present in the NE 302. The response may here be a CreateDestinationResponse message in the form of a HTTP response to the CreateDestinationRequest message. The response is a ModifyDestinationResponse to the ModifyDestinationRequest message. CreateDestinationResponse and ModifyDestinationResponse contain Acknowledgment or Error as explained above.

According to an embodiment, the LI ADMF 301 sends 402 the request to add information associated with a destination or modify information of an existing destination for a message to be sent from the NE 302 to the LI ADMF 301 over the X1 interface. The added or modified information of the destination comprises a destination identifier, DID, of the destination of the LI ADMF 301; a human-readable name associated with the destination of the LI ADMF 301; information about one or more interfaces on the NE 302 and an address of the destination of the LI ADMF 301. A DID field comprises information about the DID; a FriendlyName field comprises information about the human-readable name associated with the destination; a DeliveryType field comprises information about one or more interfaces on the NE 302; a DeliveryAddress field comprises the address of the destination of the LI ADMF 301. The destination identifier uniquely identifies a destination of the LI ADMF 301 for the X1 interface. The format for a DID can be a universally unique identifier, UUIDv4. The format for a human-readable name associated with the destination can be a free-text string. The information about one or more interfaces on the NE 302 for a message to be sent over comprises: only X1, X1 and X2, X1 and X3, or X1 and X2 and X3 and all possible combinations known in the art, such as X2 and X3, Only X2, Only X3. The format for the information about one or more interfaces can be an enumerated value, wherein an enumerated value is a user-defined data type used to map a set of names to numeric values. The enumerated values comprise one of "X1Only", "X1andX2", "X1andX3, "X1andX2andX3", and all possible combinations known in the art, such as "X2andX3", "X2Only", "X3Only". The address of the destination can be an IP Address and Port (see ETSI TS 103 280 V2.4.1); E.164 destination (see ETSI TS 103 280 V2.4.1); URI destination; email address (see ETSI TS 103 280 V2.4.1). Table 1 is a table listing examples of mandatory, optional or conditional fields that could be included in a message for adding or modifying information of a destination.

TABLE 1

Fields in the request and their description. M/C/O column describe the type of field: Mandatory, Conditional or Optional.

| Field | Description | Format | M/C/O |
|---|---|---|---|
| DID | Destination Identifier which uniquely identifies the destination | UUIDv4 | M |
| FriendlyName | A human-readable name associated with the destination | Free-text string | O |
| DeliveryType | Information about one or more interfaces for a message to be sent over | Enumerated value - one of "X1Only", "X2Only", "X3Only", "X1andX2", "X1andX3", "X2andX3" and "X1andX2andX3" | M |
| DeliveryAddress | Address of the destination | IP Address and Port; E.164 destination; URI destination; email address | M |

The LI ADMF 301 may, as illustrated in FIG. 4, also be configured to select 401 information about a type of issue to be received from the NE 302 over the X1 interface to the added or modified destination of the LI ADMF 301. The NE can identify issues that may concern a task, the NE 302 or a destination, wherein a task is a continuous instance of interception at a single NE 302 carried out against a set of target identifiers.

In an embodiment, the request in the form of a CreateDestinationRequest message sent from the LI ADMF 301 to the NE 302 comprises the DeliveryType field that comprises information representative of one or more interfaces for the message to be send over and if the interface selected for sending the message over is X1, the field also comprises the type of issue. In other words, the LI ADMF indicates in the request information about the type of issue to be received from the NE over the X1 interface to the LI ADMF address, if the NE identifies the type of issue.

The request sent from the LI ADMF 301 to the NE 302 may, in another embodiment, be a ModifyDestinationRequest message, wherein the ModifyDestinationRequest message comprises the DeliveryType field that comprises information representative of one or more interfaces for the message to be send over and if the interface selected for sending the message over is X1, the field also comprises the type of issue. In other words, the LI ADMF indicates in the request information about the type of issue to be received from the NE over the X1 interface to the LI ADMF address, if the NE identifies the type of issue.

The format for the information about one or more interfaces in the DeliveryType field and the type of issue can be an enumerated value, wherein an enumerated value is a user-defined data type used to map a set of names to numeric values. The enumerated values comprise one of "X1Only", "X2Only", "X3 Only", "X1NEOnly", "X1DestinationOnly", "X1TaskOnly", "X1NEandX1Destination", "X1DestinationandX1NE", "X1NEandX1Task", "X1TaskandX1NE", "X1DestinationandX1Task", "X1TaskandX1Destination", and all possible combinations known in the art, such as "X1NEandX2", "X1NEandX3", "X1andX3", "X1andX2", "X1andX2andX3".

Table 2 is a table listing examples of mandatory, optional or conditional fields that could be included in a message for adding or modifying information of a destination and with information about the type of issue to be sent over the X1 interface if the interface selected for sending the message over is X1.

TABLE 2

Fields in the request and their description. M/C/O column describes the type of field: Mandatory, Conditional or Optional.

| Field | Description | Format | M/C/O |
|---|---|---|---|
| DID | Destination Identifier which uniquely identifies the destination | UUIDv4 | M |
| FriendlyName | A human-readable name associated with the destination | Free-text string | O |
| DeliveryType | Information about one or more interfaces for a message to be sent over | Enumerated value - one of "X1Only", "X2Only", "X3Only", "X1TaskOnly", "X1DestinationOnly", "X1NEOnly", "X1NEandX1Destination", "X1DestinationandX1NE", "X1NEandX1Task", "X1TaskandX1NE", "X1DestinationandX1Task", "X1TaskandX1Destination", and all possible combinations. | M |
| DeliveryAddress | Address of the destination | IP Address and Port; E.164 destination; URI destination; email address | M |

According to an alternative embodiment, the request sent from the LI ADMF 301 to the NE 302 is a message wherein the message comprises the fields of CreateDestinationRequest message and an X1DeliveryTypeFilter field. The X1DeliveryTypeFilter field comprises information of the type of issue that can be delivered to the destination over the X1 interface from the NE 302.

According to an alternative embodiment, the request sent from the LI ADMF 301 to the NE 302 is a message wherein the message comprises the fields of ModifyDestinationRequest message and a X1DeliveryTypeFilter field. The X1DeliveryTypeFilter field comprises information of the type of issue that can be delivered to the destination over the interface X1 from the NE 302 and information of the X1 interface.

The format of the information comprised in the X1DeliveryTypeFilter field can be an enumerated value, wherein an enumerated value is a user-defined data type used to map a set of names to numeric values. The enumerated values comprise one of "X1TaskOnly", "X1DestinationOnly", "X1NEOnly", "X1TaskandX1Destination", "X1DestinationandX1Task", "X1TaskandX1NE", "X1NEandX1Task" "X1DestinationandX1NE", and "X1NEandX1Destination". The X1DeliveryTypeFilter filed is conditional or optional. If the DeliveryType field comprises information representative of X1 interface, the X1DeliveryTypeFilter filed is required. If the DeliveryType comprises one of "X2Only", "X3Only", and "X2andX3", the X1DeliveryTypeFilter field is not required. A default value of the X1DeliveryTypeFilter field comprises the information of the types of issue that can be delivered to the destination over the X1 interface from the NE. In other words, if nothing is specified, the default value encompasses all types of issues to be sent from the NE 302 to the destination of the LI ADMF 301 over the X1 interface. Said default value can be used if the LI ADMF does not need to distinguish among the different type of issues to be received.

Table 3 is a table listing examples of mandatory, optional or conditional fields that could be included in a message for adding or modifying information of a destination and comprising information about the type of issue to send over the X1 interface from the NE 302 to the LI ADMF 301.

TABLE 3

Fields in the request and their description. M/C/O column describes the type of field: Mandatory, Conditional or Optional.

| Field | Description | Format | M/C/O |
|---|---|---|---|
| DID | Destination Identifier which uniquely identifies the destination | UUIDv4 | M |
| FriendlyName | A human-readable name associated with the destination | Free-text string | O |

TABLE 3-continued

Fields in the request and their description. M/C/O column describes the type of field: Mandatory, Conditional or Optional.

| Field | Description | Format | M/C/O |
|---|---|---|---|
| DeliveryType | Information about one or more interfaces for a message to be sent over | Enumerated value - one of "X1Only", "X2Only", "X3Only", "X1andX2", "X1andX3", "X2andX3" and "X1andX2andX3" | M |
| X1DeliveryTypeFilter | Type of issues that can be delivered to the LI ADMF destination, default value: ALL issues | Enumerated value - one of "X1TaskOnly", "X1DestinationOnly", "X1NEOnly", "X1TaskandX1Destination", "X1DestinationandX1Task", "X1TaskandX1NE", "X1NEandX1Task", "X1DestinationandX1NE", "X1NEandX1Destination" | C |
| DeliveryAddress | Address of the destination | IP Address and Port; E.164 destination; URI destination; email address | M |

According to an embodiment, the LI ADMF 301 is configured for sending 402 the request as a first message to the NE 302 after the establishment of a connection between the LI ADMF 301 and the NE 302. If the destination for sending messages over X1 has not been created on the NE 302 yet, the NE 302 can identify an NE issue and cannot communicate the NE issue to the LI ADMF 301.

According to an embodiment, the message to be sent over the X1 interface from the NE 302 to the added or modified destination is a report issue request. A report issue request is a message sent from the NE 302 to the LI ADMF 301 after the NE 302 has identified an issue. An issue can be a warning or faults. Warnings are one-off problems i.e. sent by the NE 302 and then not referred to again over the X1 interface. Warnings shall not be used for issues which are affecting traffic (i.e. losing content or intercept-related information). For example, warnings may comprise resources being nearly exhausted but not yet traffic-affecting. Warnings should comprise that keys/certificates are about to expire. Faults are problems which the NE 302 will continue to identify and which the NE 302 is trying to manage and/or rectify. Any issue which loses traffic is categorized as a fault. Issues may concern a task, the NE 302 or a destination, wherein a task is a continuous instance of interception at a single NE 302 carried out against a set of target identifiers. A task is identified by an X1 Identifier, starts from an activate command and ends with a deactivate command or terminating fault. The type of issue comprises the issue related to the task, the destination, or the NE 302.

According to an embodiment, the NE 302 may send a report issue request called ReportTaskIssueRequest if the NE 302 identifies an issue (warning or fault) relating specifically to a particular task. The NE 302 may send a report issue request called ReportDestinationIssueRequest if the NE 302 identifies an issue (warning or fault) relating specifically to a particular destination. The NE 302 may send a report issue request called ReportNEIssueRequest if the NE 302 identifies an issue (warning or fault) relating specifically to the NE 302. NE issues can comprise hardware issue on NE 302 (storage nearly full, power issue), security issue on NE 302, any issues with logging or audit material, any report from manual changes to NE configuration. See ETSI TS 103 221-1 V1.6.1 for further details about ReportTaskIssueRequest, ReportDestinationIssueRequest, and ReportNEIssueRequest.

Figure 5:
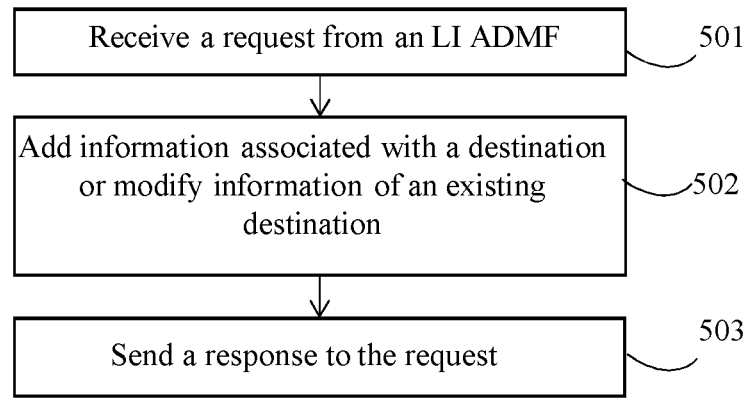
FIG. 5 is a flowchart illustrating a method performed by a communication device according to embodiments herein.

FIG. 5 is a flowchart illustrating an embodiment of a method performed by a communication device hosting an NE 302, such as one of the NE 302 of FIG. 3. Referring to FIG. 5, said method comprises:

receiving 501 a request from an LI ADMF 301 (or a host computer which hosts the LI ADMF 301), wherein the request comprises information that instructs the NE 302 to add information associated with a destination or modify information of an existing destination for a message to be sent from the NE 302 to the LI ADMF 301 over an X1 interface, adding 502 information associated with a destination or modify information of an existing destination, sending 503 a response to the request, wherein the response comprises a result associated with the request.

The request and/or response is/are received and/or sent over the X1 interface and according to a protocol between the NE 302 and the LI ADMF 301.

Figure 6:
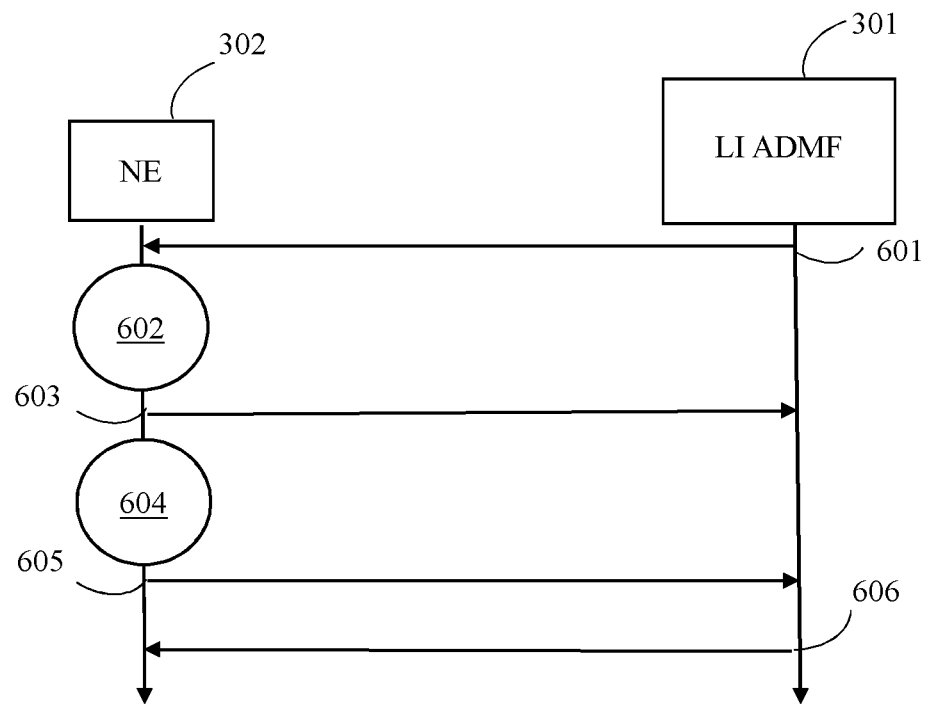
FIG. 6 is a signaling scheme illustrating messages associated with an embodiment of the invention.

FIG. 6 is a signaling scheme illustrating messages according to examples of the present disclosure for adding information associated with the destination for a message to be sent from the NE 302 to the LI ADMF 301 over the X1 interface. The LI ADMF 301 sends 601 to the NE 302 a CreateDestinationRequest message with DeliveryType="X1NEOnly"; the NE 302 receives the CreateDestinationRequest message and adds 602 information associated with the destination of the LI ADMF 301 for the X1 interface. If the NE 302 will identify an issue related to the NE 302, the NE 302 will send information about issue of the NE 302 over the X1 interface, to the destination indicated in the received CreateDestinationRequest message. The NE 302 sends 603 a CreateDestinationResponse message to the LI ADMF 301, wherein the response comprises an OK—Acknowledged and Completed. The NE 302 identifies 604 an NE issue and sends 605 a ReportNEIssueRequest message to the LI ADMF 301. The LI ADMF 301 responds 606 with a ReportNEIssueResponse message that is an OK—Acknowledged and Completed.

Figure 7:
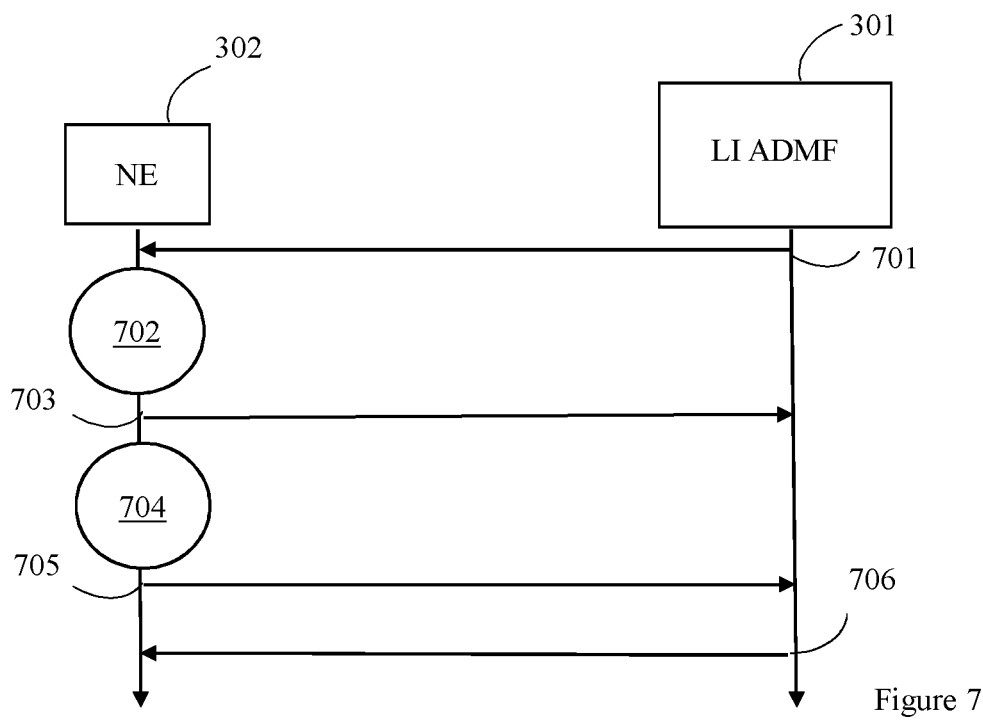
FIG. 7 is a signaling scheme illustrating messages associated with an embodiment of the invention.

FIG. 7 is a signaling scheme illustrating messages according to examples of the present disclosure for modifying information associated with an existing destination for the message to be sent from the NE 302 to the LI ADMF 301 over the X1 interface. The LI ADMF 301 sends 701 to the NE 302 a ModifyDestinationRequest message with DeliveryType="X1NEOnly"; the NE 302 receives the ModifyDestinationRequest message and modifies 702 information associated with the destination of the LI ADMF 301 for the X1 interface; the NE 302 sends 703 a ModifyDestinationResponse message to the LI ADMF 301, wherein the response comprises an OK—Acknowledged and Completed. The NE 302 identifies 704 an NE issue and sends 705 a ReportNEIssueRequest message to the LI ADMF 301. The LI ADMF 301 responds 706 with a ReportNEIssueResponse message that is an OK—Acknowledged and Completed.

Embodiments herein also relate to a lawful interception system 300 implemented in a communication network 304, wherein the lawful interception system comprises an LI ADMF 301 and an NE 302. The lawful interception system 300 is configured for the LI ADMF 301 to send a request to the NE 302, for adding information associated with a destination or modifying information of an existing destination for a message to be sent from the NE 302 to the LI ADMF 301 over an X1 interface; and the NE 302 to receive the request from the LI ADMF 301 and add information associated with the destination or modifies information of the existing destination for the message to be sent from the NE 302 to the LI ADMF 301 over the X1 interface; and the NE 302 to send a response to the LI ADMF 301. The response comprises a result associated with the request and the LI ADMF 301 is configured for receiving the response from the NE 302 to the request, wherein the response comprises a result associated with the request.

Figure 8:
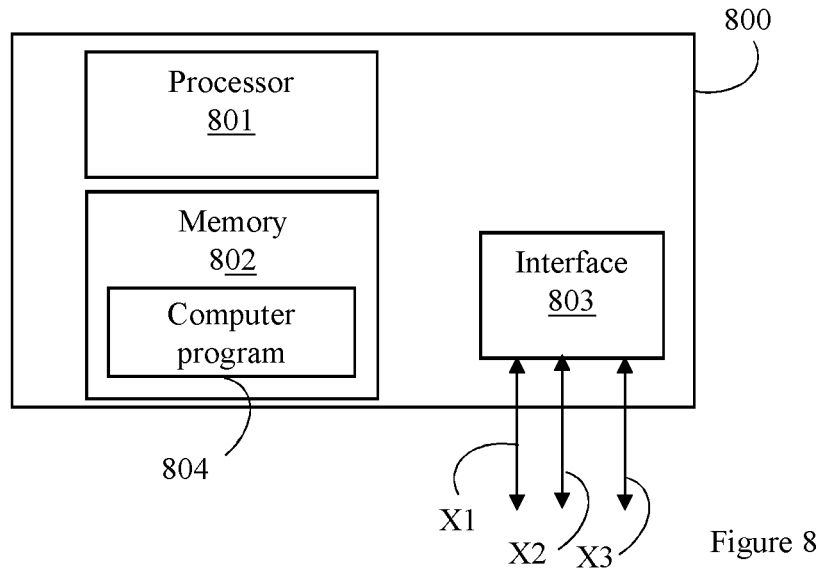
FIG. 8 is a block diagram depicting a communication device according to embodiments herein.

FIG. 8 is a block diagram illustrating an example of communication device 800, comprising a processor 801, a computer program product 802 in the form of a memory/computer readable storage means, and an interface circuitry 803. The communication device 800 is adapted to send a request to the NE 302 (or the host computer 900 which hosts the NE 302) and to receive a response from the NE 302 (or the host computer 900 which hosts the NE 302) to the request; and the memory contains instructions executable by the processor 801 whereby the communication device 800 is operative to perform a method as mentioned above in relation to the LI ADMF 301. The interface circuitry 803 of the communication device 800 is configured to receive requests and/or send responses over an interface, X1, in accordance with a predetermined protocol. Said requests and responses may be sent between the communication device 800 and NE 302 (or the host computer 900 which hosts the NE 302).

The computer program product 802 comprises a computer program 804, which comprises computer program code loadable into the processor 801, wherein the computer program 804 comprises code adapted to perform of one or more of the steps of the methods and the embodiments described herein, when the computer program code is executed by the processor 801. In other words, the computer program 804 may be an LI AMDF 301 software hosted by the communication device 800.

Figure 9:
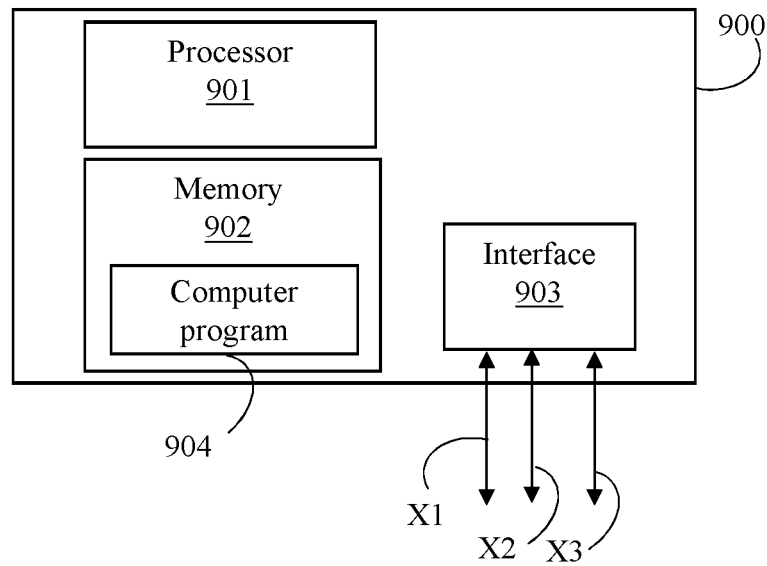
FIG. 9 is a block diagram depicting a communication device according to embodiments herein.

FIG. 9 is a block diagram illustrating an example of a communication device 900, comprising a processor 901, a computer program product in the form of a computer readable storage means/memory 902 and interface circuitry 903. The communication device 900 is adapted to receive a request from an LI ADMF 301 (or the host computer 800 which hosts the LI ADMF 301); add the destination or modify information of the existing destination; send a response to the request. The memory 902 contains instructions executable by the processor 901 whereby the communication device 900 is operative to perform a method as summarized above in relation to the NE 302. The interface circuitry 903 of the communication device 900 is configured to receive requests and/or send responses over an interface, X1, in accordance to a predetermined protocol. Said requests and responses are sent between LI ADMF 301 (or the host computer 800 which hosts the LI ADMF 301) and the communication device 900.

The computer program product 902 comprises a computer program 904, which comprises computer program code loadable into the processor 901, wherein the computer program 904 comprises code adapted to perform of one or more of the steps of the methods and the embodiments described herein, when the computer program code is executed by the processor 901. In other words, the computer program 904 may be an NE 302 software hosted by the communication device 900.

The invention claimed is:

1. A communication device comprising a lawful interception (LI) Administration Function (ADMF), the communication device comprising a processor and a memory, said memory containing instructions executable by said processor, whereby the communication device is operative to:
   select information about a type of issue to be sent in a message to the LI ADMF from a network element (NE) over an X1 interface according to ETSI TS 103 221-1;
   send a request to the NE, that is configured to perform an action associated with a lawful interception, to add information associated with the LI ADMF and information about one or more interfaces on the NE over which the message will be sent, or to modify information associated with the LI ADMF and information about one or more interfaces for the message to be sent from the NE to the LI ADMF over the X1 interface, wherein the request comprises the information about the type of issue in a DeliveryType field or in an X1 DeliveryTypeFilter field; and
   receive a response from the NE to the request, wherein the response comprises a result associated with the request.

2. The communication device according to claim 1, wherein the added or modified information comprises a destination identifier, a human-readable name associated with the LI ADMF, and an address of the LI ADMF.

3. The communication device according to claim 1, wherein the response comprises information representative of any one of the following:
   an OK-Acknowledged and Completed, if the request is successfully completed;
   an OK-Acknowledged if the request cannot be completed within a predetermined time; and
   a predetermined error if the NE was unable to perform or understand the request.

4. The communication device according to claim 1, wherein the request comprises information indicative of two or more interfaces for the message to be sent over, wherein the two or more interfaces are X1 and X2, or X1 and X3, or X1 and X2 and X3.

5. The communication device according to claim 1, wherein the request is a CreateDestinationRequest message or a ModifyDestinationRequest message.

6. The communication device according to claim 1, wherein the message is a report issue request, wherein the report issue request is to be sent from the NE to the LI ADMF after the NE has identified the type of issue, wherein the type of issue comprises an issue related to a task, a destination, and the NE.

7. The communication device according to claim 1, wherein the request is a message that comprises the fields of CreateDestinationRequest and an X1 DeliveryTypeFilter field, wherein the X1DeliveryTypeFilter field comprises information of the type of issue that can be delivered to the LI ADMF over the X1 interface from the NE.

8. A communication device, which hosts a network element (NE) and comprises a processor and a memory, said memory containing NE instructions for performing an action associated with a lawful interception and executable by said processor, whereby said communication device is operative to:
  receive a request from a lawful interception (LI) Administration Function (ADMF), wherein the request comprises information that instructs the NE to add information associated with the LI ADMF and information about one or more interfaces on the NE over which a message will be sent, or to modify information associated with the LI ADMF and information about one or more interfaces for the message to be sent from the NE to the LI ADMF over an X1 interface according to ETSI TS 103 221-1, wherein the request comprises information about a type of issue in a Delivery Type field or in an X1DeliveryTypeFilter field;
  add the information associated with the LI ADMF and the information about one or more interfaces on the NE over which the message will be sent, or modify the information associated with the LI ADMF and the information about one or more interfaces for the message to be sent from the NE to the LI ADMF over the X1 interface according to ETSI TS 103 221-1; and
  send a response to the request, wherein the response comprises a result associated with the request.

9. The communication device according to claim 8, wherein the added or modified information comprises a destination identifier, a human-readable name associated with the LI ADMF, and an address of the LI ADMF.

10. The communication device according to claim 8, wherein the response comprises information representative of any one of the following:
  an OK-Acknowledged and Completed, if the request is successfully completed;
  an OK-Acknowledged if the request cannot be completed within a predetermined time; and
  a predetermined error if the NE was unable to perform or understand the request.

11. The communication device according to claim 8, wherein the request comprises information indicative of two or more interfaces for the message to be sent over, wherein the two or more interfaces are X1 and X2, or X1 and X3, or X1 and X2 and X3.

12. The communication device according to claim 8, wherein the request is a CreateDestinationRequest message or a ModifyDestinationRequest message.

13. The communication device according to claim 8, wherein the message is a report issue request, wherein the report issue request is to be sent from the NE to the LI ADMF after the NE has identified the type of issue, wherein the type of issue comprises an issue related to a task, a destination, and the NE.

14. The communication device according to claim 8, wherein the request is a message that comprises the fields of CreateDestinationRequest and an X1 Delivery TypeFilter field, wherein the X1DeliveryTypeFilter field comprises information of the type of issue that can be delivered to the LI ADMF over the X1 interface from the NE.

15. The communication device according to claim 8, wherein the request is a message that comprises the fields of ModifyDestinationRequest and an X1 Delivery TypeFilter field, wherein the X1DeliveryTypeFilter field comprises information of the type of issue that can be delivered to the LI ADMF over the X1 interface from the NE.

16. The communication device according to claim 8, wherein the LI ADMF is configured for sending the request as a first message to the NE after establishment of a connection with the NE.

17. The communication device of claim 8, the communication device being a radio base station.

18. The communication device of claim 8, wherein the NE is one of an Access and Mobility Management Function, a User Plane Function, and a Unified Data Management.

19. A method performed by a communication device comprising lawful interception (LI) Administration Function (ADMF), the method comprising:
  selecting information about a type of issue to be sent in a message to the LI ADMF from a network element (NE) over an X1 interface according to ETSI TS 103 221-1;
  sending a request to the NE, that is configured to perform an action associated with a lawful interception, to add information associated with the LI ADMF and information about one or more interfaces on the NE over which the message will be sent, or to modify the information associated with the LI ADMF and the information about one or more interfaces for the message to be sent from the NE to the LI ADMF over the X1 interface, wherein the request comprises the information about the type of issue in a DeliveryType field or in an X1DeliveryTypeFilter field; and
  receiving a response from the NE to the request, wherein the response comprises a result associated with the request.

20. A method performed by a communication device hosting a network element (NE), the method comprising:
  receiving a request from a lawful interception (LI) Administration Function (ADMF) for adding information associated with the LI ADMF and information about one or more interfaces on the NE over which a message will be sent, or for modifying information associated with the LI ADMF and information about one or more interfaces for a message to be sent from the NE to the LI ADMF over an X1 interface according to ETSI TS 103 221-1, wherein the request comprises information about a type of issue in a DeliveryType field or in an X1 DeliveryTypeFilter field;
  adding the information associated with the LI ADMF and the information about one or more interfaces on the NE over which a message will be sent, or modifying the information associated with the LI ADMF and the information about one or more interfaces for a message to be sent from the NE to the LI ADMF over an X1 interface according to ETSI TS 103 221-1; and
  sending a response to the request, wherein the response comprises a result associated with the request.

* * * * *